Jan. 8, 1935.  D. E. ROSS  1,986,981
MEANS FOR FASTENING METAL SHAPES
Filed March 12, 1934
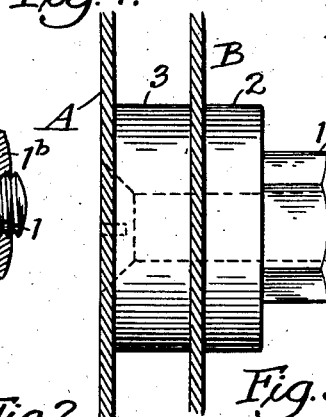
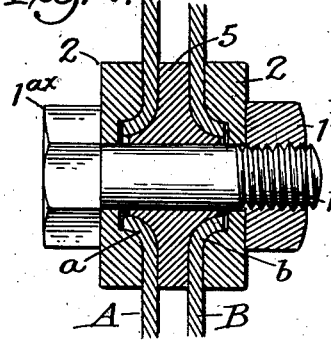
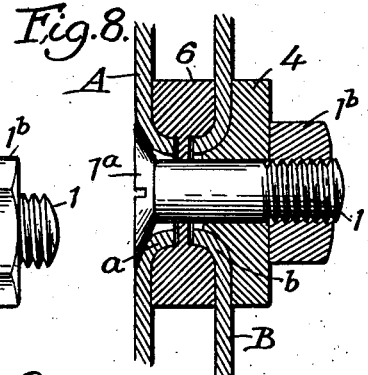
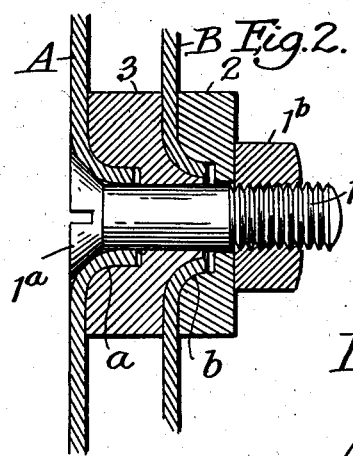
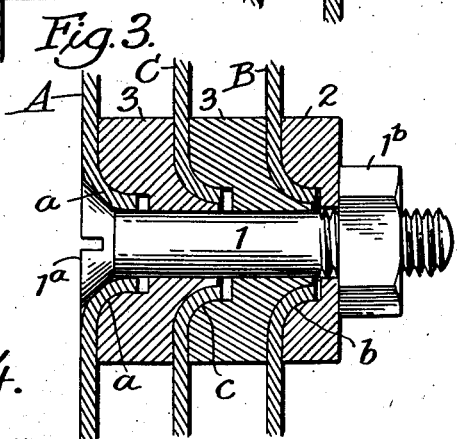
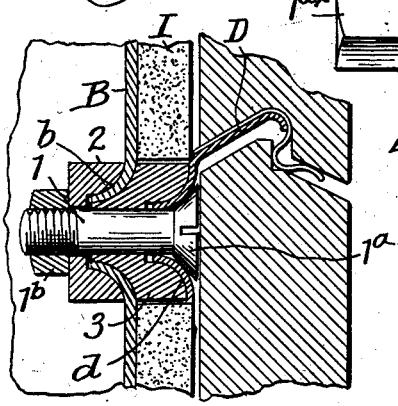
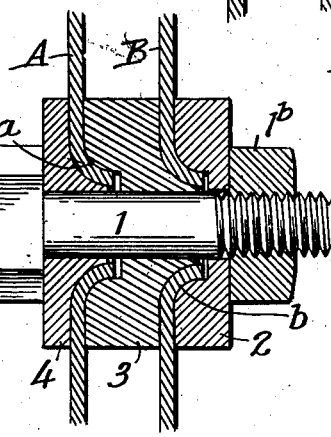
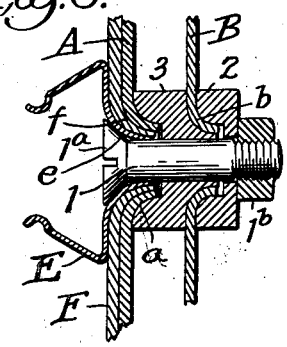
Inventor
David E. Ross.
By Alexander D. Lowell
Attorneys Patented Jan. 8, 1935

1,986,981

UNITED STATES PATENT OFFICE 1,986,981

MEANS FOR FASTENING METAL SHAPES

David E. Ross, Lafayette, Ind., assignor to Rostone, Incorporated, Lafayette, Ind., a corporation of Indiana Application March 12, 1934, Serial No. 715,220

7 Claims. (Cl. 189—36)

This invention is a novel means for fastening metal shapes together, and is an improvement upon the fastening means shown in my companion application filed June 12, 1933 Serial No. 675,485.

The fastening means is designed and used for connecting structural metal shapes of light gauge material and to prevent shearing or tearing of the thin metal surfaces under strain by increasing the bearing surfaces of the shapes relative to the fastening bolts or rivets where they are subjected to the greatest tearing and shearing strains.

The object of the present invention is to enable the metal shapes to be spaced apart when desired while maintaining the increased bearing surfaces at the fastening points, and for this purpose I provide washers each having a conoidal projection on one side and a conoidal recess on the other side adapted to fit between the complementary projections and recesses of adjacent shapes of a thickness equaling the desired space or thickness to be maintained between the shapes.

In utilizing the invention the metal of the shapes around the bolt or rivet holes at the points where the shapes are to be connected is drawn out in such manner as to form conoidal projections similar to frustums of hollow cones around such holes. The fastening bolt or rivet extends through such aligned projections and washers each having a conoidal projection on one side and a complementary recess on the other side are interposed between the shapes that are to be spaced apart, said washers being transfixed by the bolt or rivet which binds the shapes and washers firmly together. Preferably I employ a bolt having a conical head adapted to fit within the conoidal recess of the adjacent shape, and place on the other end of the bolt a washer having a conoidal recess adapted to fit the adjacent complementary projection.

I will explain the invention in detail with reference to the accompanying drawing which illustrates portions of metal shapes connected by my novel devices and set forth in the claims the novel features of construction and combinations of parts for which protection is desired.

In said drawing:—

Fig. 1 is a detail view of portions of two metal shapes connected by my novel means. Fig. 2 is a vertical section through Fig. 1 in the plane of the bolt.

Fig. 3 is a similar section showing how three or more spaced shapes may be connected.

Fig. 4 is a view similar to Fig. 2 showing a flat headed bolt and convex washer.

Fig. 5 is a detail sectional view showing structural shapes and exterior wall supporting members connected by my improved fastening means.

Fig. 6 is a similar view showing structural shapes and interior wall supporting members connected by my improved means.

Fig. 7 is a section similar to Fig. 2 showing another arrangement of the shapes, spacing washer and fastening means.

Fig. 8 is a similar section showing still another arrangement of the shapes, spacing washer and fastening means.

In the drawing A, B, C indicate portions of metal shapes which are to be united and spaced apart. These shapes may be flat plates, studs, or other metal members or parts of the metal framing of a building. At the points where the respective shapes are to be connected they are perforated for the passage of connecting bolts or rivets, and the metal adjacent the perforations is pressed to form a conoidal projection on one side of the shape resembling the frustum of a cone, surrounding the perforation, such projections being indicated at a, b, c.

Interposed between the adjacent plates A, B (Fig. 1) is a washer 3 which is preferably of a thickness corresponding to the desired space between the shapes A, B when fastened together. Said washer has a conoidal recess in one side which neatly fits the adjacent conoidal projection a of shape A; and said washer also has a conoidal projection on its opposite side which neatly fits into the conoidal recess in shape B. After the parts are properly assembled a fastening bolt or rivet 1 is passed through the axially aligned projections a, b and washer 3. As shown the bolt preferably has a conical head 1a which is adapted to fit within the conoidal recess in shape A.

On the projecting end of the bolt is placed a washer 2 having a conoidal recess which fits the end of the projection b of the adjacent plate. The assembly is then clamped together by a nut 1b on bolt 1.

If desired instead of using a bolt with a conical head 1a, a bolt with an ordinary head 1ax (Fig. 4) may be used. In such case a washer 4 having a conoidal projection to fit into the complementary shaped recess of the adjacent plate is inserted between the bolt head and the shape A, and when nut 1b is tightened the washers and shapes are firmly clamped together.

In Fig. 3 an intermediate shape C is shown between the shapes A and B, shape C being provided with a conoidal projection c similar to projections

*a, b*. A washer 3 is shown interposed between plates A and C, and a similar washer 3, between plates B and C; the parts being secured and fastened together by bolt 1 as above described.

In Fig. 7 the shapes A, B are shown so arranged that both the conoidal projections *a, b* in said plates face oppositely, instead of in the same direction, and the interposed spacing washer 5 has conoidal projections on each side adapted to fit into the recessed portions of the alined projections of the shapes. Washers 2, similar to those in Fig. 2, are arranged exterior to both plates and the assembly is secured by a bolt 1 transfixing the washers, spacer and projections.

In Fig. 8 the shapes A, B are shown so arranged that the conoidal projections *a, b* project inwardly toward each other: and the shapes are separated by a spacing washer 6 having conoidal recesses in its opposite faces adapted to receive the aligned projections *a, b* of the shapes. The assembly is secured by a bolt 1 having a conical head 1*a*, as in Fig. 2, engaging the conoidal recess of the shape A, and a washer 4 having a conoidal projection is placed on the bolt 1 exterior to shape B.

In Fig. 5 an exterior wall supporting shape D is shown attached to but spaced from a frame shape B by washer 3, these shapes being provided with hollow conoidal projections *d* and *b* adapted to nest with the projections on the washer and are fastened in place by the bolt 1 and nut 1*b* as above described.

In Fig. 6 an interior wall supporting shape E is shown having a hollow conoidal projection *e* nesting with a projection *f* on a shape F, projection *f* nesting with the projection *a* on shape A and the assembly is united by a bolt and nut as above described. The direct nesting of shapes as shown at *a, e, f*, (Fig. 6) is covered in my aforesaid application.

The use of intermediate washers 3 spacing adjacent shapes enables insulating boards as I (Fig. 5) to be placed between the adjacent shapes; or provides a space between adjacent shapes which space can be used for other purposes in metal building construction.

In Figs. 1, 2, 4, 7 and 8 I have shown two spaced shapes, and in Fig. 3 three spaced shapes; and obviously four or more shapes of metal could be connected in the manner hereinabove noted.

Figs. 2, 7 and 8 show different ways in which the plates A, B may be relatively assembled, spaced apart and secured, by substantially the same means in accordance with my invention.

The space between the adjacent shapes can be fixed and determined by the thickness of the washers employed; or by employing a plurality of washers between the shapes.

The conoidal recesses and projections of the plates and washers greatly increase the extent of contact surface between the shapes and with the bolt; the strength of such connection is enhanced by the tension of the bolt, and by contact of the nested conoidal surfaces of the projections with the conoidal recesses of the washers and shapes so that the liability of thin metal plates to tear at the bolt openings, or to shear the bolt, is greatly lessened; and the strength of the connection between the shapes increased. While I prefer to use bolts, in some cases rivets may be employed in place of the bolts if desired.

I claim:—

1. In combination; metal shapes provided with perforations and preformed conoidal projections on one of their sides around such perforations and complementary recesses on their other sides; a washer interposed between adjacent shapes having its sides adapted to fit the conoidal portions of the alined projections when the shapes and washer are assembled; and a securing member extending through the nested projections and washer and provided with means to fit the exterior conoidal portion of one shape.

2. In combination, a plurality of metal shapes having portions provided with perforations and preformed conoidal projections on one of their sides around such perforations and complementary recesses on their other sides; a washer having a bore and portions at the ends of said bore adapted to fit the conoidal portions of the alined projections and recesses when the shapes and washer are assembled, an exterior washer adapted to fit the exterior conoidal portion of one shape, and a securing member extending through the nested washers and projections.

3. In combination; metal shapes provided with perforations, and preformed conoidal projections on one of their sides around such perforations and complementary recesses on their other sides; a washer interposed between adjacent shapes having conoidal portions on its sides adapted to fit the conoidal portions of adjacent shapes when the shapes and washer are assembled; and a securing member extending through the nested projections and washer and provided with means to fit the exterior conoidal portion of one shape.

4. In combination, a plurality of metal shapes having portions provided with perforations, and preformed conoidal projections on one of their sides around such perforations and complementary recesses on their other sides; a washer having a bore and conoidal portions at opposite ends of said bore; the conoidal portions of the shapes and washer being adapted to fit the conoidal portions of the adjacent washer and shapes when they are assembled, an exterior washer having a conoidal portion fitted to the conoidal portion of an exterior shape; and a securing member extending axially through the nested washers and projections.

5. In combination, a plurality of metal shapes having portions provided with perforations and preformed conoidal projections on one of their sides around such perforations and complementary recesses on their other sides; a washer having a bore and conoidal portions at opposite ends of said bore, the conoidal portions of the shapes and washer being adapted to fit the conoidal portions of the adjacent washer and shapes when they are assembled, an exterior washer having a conoidal recess fitted to the conoidal projection of an exterior shape; a second exterior washer having a conoidal projection fitted to the recess of an exterior shape, and a securing member extending axially through the washers and alined projections.

6. In combination; metal shapes provided with perforations and preformed conoidal projections on one of their sides around such perforations and complementary recesses on their other sides; a washer interposed between adjacent shapes having conoidal projections on its sides adapted to fit within the alined conoidal recesses of adjacent shapes when the shapes and washer are assembled; a securing member extending through the alined projections of the shapes and washers; and washers on said member engaging the exterior conoidal portions of the nested washers and shapes.

7. In combination; a plurality of metal shapes having portions provided with perforations and preformed conoidal projections on one side around such perforations and complementary recesses on their other sides, a washer having a bore and conoidal recesses at opposite ends of said bore adapted to receive the alined conoidal projections of adjacent shapes when the shapes and washer are assembled; and a securing member extending through the alined washer and projections and provided with means to fit the exterior conoidal recess of an exterior shape.

DAVID E. ROSS.